3,317,477
PROCESS FOR THE PREPARATION OF STYRENE-OXYMETHYLENE COPOLYMERS AND RESULTING PRODUCT
Walter Wilson and Herbert May, Birmingham, England, assignors to British Industrial Plastics Limited, London, England, a corporation of the United Kingdom
No Drawing. Filed Nov. 16, 1961, Ser. No. 152,934
Claims priority, application Great Britain, Nov. 21, 1960, 40,020/60
9 Claims. (Cl. 260—73)

The present invention relates to novel polymeric products which can be obtained from trioxan and to the preparation of these polymeric products.

It is known that formaldehyde reacts with styrene in glacial acetic acid containing concentrated sulphuric acid by the so-called "Prins reaction" (H. J. Prins, Proc. Acad. Sci. Amsterdam, 1919, 22, 51). The product of this reaction has been shown to have the formula:

$$C_6H_5.CHOH.CH_2CH_2OH$$

(E. Fournean et al., Bull. soc. chim., 1930, 47, (4), 860.)
It is also known that styrene can be polymerised using electrophilic catalysts, such as boron trifluoride and complexes thereof.

We have now found that useful polymeric products can be prepared by reacting trioxan with styrene or styrene derivatives under substantially anhydrous conditions in the presence of an electrophilic catalyst.

Accordingly, the present invention provides a process for the preparation of valuable polymeric products which comprises reacting trioxan under substantially anhydrous conditions in the presence of an electrophilic catalyst with styrene and/or at least one styrene derivative.

Particularly valuable polymeric materials are obtained using alpha-substituted styrenes such as alpha-methyl styrene and 1,1-diphenyl ethylene which is alpha-phenyl styrene. Beta-substituted styrenes such as stilbene which is beta-phenyl styrene and compounds in which the beta-substituent is linked to the phenyl ring of the styrene to form a ring such as indene, coumarone and acenaphthylene can also be used to form useful polymeric products in accordance with the process of the present invention. Ring-substituted styrenes such as o-, m- p-methyl-styrene and 1-vinyl and 2-vinyl naphthalene are also suitable for use. These naphthalene derivatives can be considered to be ring-substituted styrenes in which the ring substituents are joined together to form another ring, namely the second benzene ring of the naphthalene molecule. Anethole, which is p-methoxy beta-methyl styrene is an example of a styrene derivative which is both beta and ring-substituted and which is suitable for use in the process of the present invention.

Valuable products may also be obtained by reacting trioxan with styrene and/or at least one styrene derivative and at least one other compound capable of copolymerising with trioxan in the presence of an electrophilic catalyst. Examples of particularly suitable compounds which can be reacted with trioxan and styrene and/or one or more styrene derivatives in accordance with the present invention are the cyclic ethers disclosed in French patent specification No. 1,221,148, and the compounds which are disclosed in published British patent specifications 998,479, 1,002,761, 1,022,561, and 1,022,563 as suitable for use in preparing polymeric products by reaction with trioxan.

British Patent 998,479 describes the preparation of polymeric products by the reaction of trioxan with cyclic carboxylic esters which are substantially more reactive towards trioxan than are gamma-lactones. Such cyclic esters are those in which the ester ring contains at least three carbon atoms and at least one oxygen atom excluding esters having 5-membered rings other than those also containing an ether linkage. The preparation of polymeric products by the reaction of trioxan with such cyclic esters together with styrene and/or styrene derivatives is disclosed in British Patent 998,479.

British Patent 1,002,761 describes the preparation of valuable polymeric products by the reaction of trioxan with at least one aldehyde and it is stated that aldehydes containing electro-negative substituent groups, such as halogenated aliphatic aldehydes for example chloral, and aromatic aldehydes for example benzaldehyde, anisaldehyde and cinnamaldehyde, may usefully be used. The preparation of polymeric products by the reaction of trioxan with such aldehydes and substituted aldehydes together with styrene and/or styrene derivatives is disclosed in British Patent 1,002,761.

British Patent 1,022,561 describes compounds which are capable of undergoing cationic polymerisation and which can be reacted in the process of the present invention with trioxan and styrene and/or at least one styrene derivative. The compounds described in the specification of British Patent 1,022,561 are vinyl compounds which are capable of copolymerising with trioxan and examples of suitable vinyl compounds are:

(1) Vinyl ethers such as methyl vinyl ether, ethyl vinyl ether and phenyl vinyl ether;
(2) N-vinyl and C-vinyl substituted derivatives of aromatic heterocyclic compounds such as N-vinylcarbazole and 2-vinyl-pyridine; and
(3) Unsaturated hydrocarbons such as isobutene, butadiene, isoprene, cyclohexene, cyclopentadiene and beta-pinene.

British Patent 1,022,563 describes the reaction of trioxan with allyl ethers and esters and such allyl compounds are also suitable for use in the process of the present invention. Examples of suitable allyl ethers and esters are allyl acetate, allyl ethyl ether and allyl bromide.

Trioxan can be reacted with at least one compound containing one or more isocyanate groups and such compounds are also suitable for use in the process of the present invention. Examples of suitable isocyanates are aliphatic isocyanates and aromatic isocyanates such as phenyl isocyanate and toluene 2,4-diisocyanate.

Trioxan can be reacted with at least one compound containing one or more nitrile groups and such compounds are also suitable for use in the process of the present invention. Particularly suitable nitriles are aliphatic saturated nitriles such as acetonitrile, adiponitrile and succinonitrile, unsaturated nitriles such as acrylonitrile, aromatic nitriles such as benzonitrile and polymeric substances containing nitrile groups such as polyacrylonitrile and styrene-acrylonitrile copolymers.

As hereinbefore stated, the reaction is carried out in the presence of an electrophilic catalyst and particularly suitable electrophilic catalysts which can be used in the process of the present invention are:

(1) Metal and metalloidal fluorides, chlorides and a few bromides, belonging to the general class of catalysts which are usually effective as a catalysts in the Friedel-Crafts acylation reaction. Boron trifluoride which is a gaseous catalyst and boron trichloride which is a volatile liquid are particularly suitable for processes carried out in the absence of an inert liquid medium. Such catalysts are well described in the literature, for example in the following articles or books:

N. O. Calloway Chemical Reviews 1935 M, 327; O. C. Dermer, D. M. Wilson, F. M. Johnson and V. H. Dermer, J. Amer. Chem. Soc. 1941, 63, 2881; E. E. Royals, "Advanced Organic Chemistry," published by Constable, London, p. 467; G. W. Wheland, "Advanced Organic Chemistry," second edition, published by Chapman & Hall, London, 1949, pages 80, 83; and V. Migrdichian "Organic Synthesis," published by Reinhold, New York, 1957, page 628.

Those catalysts most effective in the classical Friedel-Crafts acylating reaction are not always the best in the process of the present invention. We have found that boron trifluoride, stannic chloride and ferric chloride are particularly useful; boron trichloride, stannic bromide and other compounds which are exemplified later are also effective.

(2) Complexes of catalysts defined in (1) with water and with organic compounds in which the donor atom is oxygen or sulphur, for example alcohols, ethers, carboxylic acids or dialkyl sulphides. Useful catalysts in this class are the complexes of diethyl ether with boron trifluoride, stannic chloride, stannic bromide, boron trichloride and ferric chloride, and of boron trifluoride with acetic acid, butyl alcohol or water. When the preferred process is carried out in the presence of an inert liquid medium, it is advantageous for the catalysts to be soluble in this medium; this is particularly the case when the polymerisation is carried out at a temperature below 60° C. The complexes of boron trifluoride with higher ethers such as dibutyl and di-isoamyl ethers, which complexes are soluble in solvents such as hexane, are therefore particularly useful.

(3) Non-oxidising inorganic acids and the complexes thereof with boron trifluoride. Examples are dihydroxyfluoroboric acid, polyphosphoric acid and its complex with boron trifluoride and the complex of boron trifluoride with phosphoric acid.

(4) Complexes of boron trifluoride with very weakly basic nitrogen compounds, in which complexes the nitrogen is the donor atom. Examples are the complexes with diphenylamine and N-phenyl 1 or 2 naphthylamine and acetamide. The complexes of boron trifluoride with stronger bases such as ammonia and aliphatic amines are, however, useless as catalysts in the process of the present invention.

(5) Halogens and interhalogen compounds, for example, bromine, iodine, iodine monobromide, iodine monochloride, and iodine trichloride.

(6) Oxonium salts. Examples are triethyl oxonium borofluoride ($Et_3O^+BF_4^-$), triethyloxonium tetrachloroaluminate ($Et_3O^+AlCl_4^-$) and triethyloxonium hexachloroantimonate ($Et_3O^+SbCl_6^-$). These and other suitable oxonium salts may be prepared, for example by the methods described by H. Meerwein, E. Battenberg, H. Gold, E. Pfeil and G. Willfang in J. Prakt. Chem., 1939, 154, 83–156.

The reaction is preferably effected in the presence of an inert liquid medium. This inert medium, wich should be well dried, enables the reaction to be carried out in a controlled manner by ensuring uniform distribution of the catalyst and reactants and by facilitating dissipation of the heat of reaction. The use of a liquid medium is also advantageous in giving the product in the form of an easily handled slurry. The inert liquid medium may be one in which the trioxan, styrene and/or styrene derivatives, other reactants if any, and the catalyst are dissolved at the temperature employed. One or more of the reactants (trioxan, styrene and/or styrene derivatives, other reactants and catalyst) may, however, be dispersed or partly dispersed and partly dissolved in a finely divided form in the liquid medium. Examples of suitable inert liquid media are saturated aliphatic and cycloaliphatic hydrocarbons, chlorinated aliphatic and cycloaliphatic hydrocarbons such as dichloromethane, aliphatic and aromatic nitro-hydrocarbons and carboxylic acids. Particularly advantageous results have been obtained using n-hexane which dissolves a minor proportion of the trioxan and light petroleum fractions in the hexane range which have a boiling point between 60 and 70° C. and which consist mainly of normal paraffins have also been used with success. If, however, the styrene, styrene derivatives and other reactants if used, are soluble in or miscible with molten trioxan, the reaction may be effected without the use of such an inert liquid medium.

The reaction may be carried out at a temperature between 0 and 100° C., and preferably between 40 and 70° C. The amount of styrene and/or substituted styrene and other reactants if used, may vary from 0.1 to 99% by weight, but the preferred amount is from 0.5 to 20% by weight of the total weight of reactants. As hereinbefore stated, the reaction must be carried out under substantially anhydrous conditions and most satisfactory results are obtained when the water content of the reaction system is less than 0.1%, preferably less than 0.05% by weight.

As the reaction proceeds, fresh trioxan, styrene and/or styrene derivatives and other reactants if any, may be continuously or progressively introduced into the reaction zone in which the catalyst is already present or into which the catalyst is likewise continuously or progressively introduced. If desired, the reaction can be carried out as a completely continuous process by continuously or progressively withdrawing the polymeric product which is produced.

The reaction is preferably carried out under a dry atmosphere which is inert with respect to the reaction such as nitrogen and/or carbon dioxide suitably at atmospheric pressure although higher pressures may be employed.

It should further be noted that the styrene and/or substituted styrene and some other reactants may be partially polymerised prior to their reaction with the trioxan. This can conveniently be effected by partially polymerising the styrene or styrene derivatives in solution with the catalyst in an inert liquid medium, such as hexane, and then adding the solution of styrene partial polymer containing the catalyst to a dispersion of trioxan in an inert liquid medium, such as hexane.

When certain other compounds capable of copolymerising with trioxan are reacted with trioxan and styrene and/or styrene derivatives in accordance with the present invention, these compounds may be partially polymerised or partially reacted with trioxan or styrene and/or styrene derivatives prior to the introduction into the reaction zone of the other reactant, or reactants. For instance, 1,3-dioxolan may be partially polymerised with the catalyst in solution in cyclohexane or dispersed in n-hexane, and the resulting solution or dispersion of the partially polymerised cyclic ether containing the catalyst then added to a solution or dispersion of trioxan and styrene and/or styrene derivatives in an inert liquid medium such as n-hexane. The reaction of styrene and/or styrene derivatives with partially polymerised trioxan has, however, proved difficult in view of the rapidity of the polymerisation reaction of trioxan.

At the end of the reaction, an organic solvent such as acetone or dichloromethane or an aqueous solution of a complexing agent suitable for the particular metallic or metalloidal ion may be added and the polymeric product filtered off and washed with more solvent or solution. The purpose of this washing is to remove any unreacted trioxan, styrene, styrene derivative and/or ether reactants which may thus be recovered, and to remove at least part of the catalyst residues.

It is important to effect a substantially complete removal of catalyst residues from the polymeric material and this removal can advantageously be carried out by reducing the polymeric product into a finely divided state suitably by ball-milling in the presence of an extraction liquid for the catalyst residues which are freed, for example, by milling. The extraction liquid may be an organic solvent for example acetone or dichloromethane in which the catalyst dissolves, or it may be a solution of a complexing agent for the metallic or metalloidal ions of the catalyst, for example ammonia or hydrazine, or a sequestering agent. More details of the factors which govern the selection of a suitable extraction liquid and of the removal of catalyst residues are given in British Patent 1,009,881 and it will be seen that the catalyst removal process should leave the product in either a neutral or slightly alkaline condition. It is for this reason that, if a strongly alkaline or acidic extraction liquid is used to remove the metallic or metalloidal part of the catalyst residue, it is essential to render the treated polymeric product neutral or slightly alkaline by removing all traces of acid and caustic alkali. This can conveniently be done by giving the product a final treatment with a hot dilute aqueous solution of a weak base, such as ammonia, triethanolamine, hydrazine or an amine.

The thermal stabilities of the products of the present invention, as expressed by the rate of loss of weight at 222° C. ($K_{222}$) measured by the method described by Schweitzer, Macdonald & Punderson in the Journal of Applied Polymer Science, 1959, 1, 160, are such that in some cases the product can be used without further stabilisation. However, some products do require such stabilisation and others benefit by such stabilisation insofar as their initial thermal stabilities, as determined by the percentage loss of weight during the first 30 minutes of heating at 220° C., are improved. It is important for the products to have a high initial thermal stability if they are to be moulded for satisfactory mouldings to be obtained by conventional moulding processes.

Such further stabilization of the products can be obtained by incorporating therein substances which react with any free end groups and typically reactive substances for this purpose are identified in U.K. patent specification No. 557,873 and include acid anhydrides and isocyanates. The products of the present invention are preferably stabilised by the incorporation therein of antioxidants, for example aromatic amines, such N-phenyl-1-naphthylamine, N-phenyl-2-naphthylamine, diphenylamine and di-2-naphthyl p-phenylene diamine, ultra-violet light-absorbing substances for example substituted benzophenones such as 2,2'-dihydroxy-4,4'-dimethoxy-benzophenone and 2-hydroxy-4-methoxy-benzophenone; and substances capable of reacting with formaldehyde, for example hydrazines, ureas and thioureas such as ethylene urea and phenyl thiourea, phenols such as 2-methyl-4,6-di-tert-butyl phenol and polyamines.

Further stabilisation of the products may be effected by incorporating therein a polymeric substance containing —CO—NH— groups in accordance with the process described in British Patent 1,009,883. Examples of suitable polymeric substances which can be used for this purpose are polyamides, polyurethanes, polyureas, polyacrylamides and polypeptides.

Although the polymeric products stabilised by the above methods can usefully be used for the production of plastic moulding compositions, films, fibres and protective coatings, they may possess the disadvantage to a varying degree of evolving gas during normal injection moulding. This liberation of gas causes the formation of bubbles and faults in moulded products and, in order to avoid this evolution of gas, it is advantageous to give the product a heat treatment in accordance with the process described in British Patent 1,009,881. Full details of the conditions which should be used for this heat treatment are given in the last mentioned copending application but, by way of example, it may be mentioned that it is generally satisfactory to heat the product in an oven at atmospheric pressure in an atmosphere of nitrogen or another gas which is inert with respect to the polymeric product for 10 to 20 minutes at a temperature of 220° C.

The products of the present invention are useful industrial products and exhibit a wide range of properties which vary depending upon the nature of the styrene and/or styrene derivatives and on the relative proportions of the styrene and/or styrene derivative, other reactants, if any, and the trioxan in the product; those products which contain a large proportion of trioxan resemble polyoxymethylenes. Many of these polymeric products are useful in the manufacture of plastic moulding compositions, films, fibres and protective coatings and, for such applications, the products may be mixed with lubricants, fillers and pigments in addition to the antioxidants and stabilisers hereinbefore mentioned.

The invention is illustrated by the following examples in which the thermal decomposition rates ($K_{222}$) were determined by the method described by Schweitzer et al. in the aforementioned journal and in which the inherent viscosities are as measured at 60° C. as 0.5% by weight solutions in p-chlorophenol containing 2% by weight alpha-pinene.

*Example 1*

A 2 litre reaction flask fitted with a thermometer, a stirrer, a gas inlet and outlet and a condenser was heated to remove any moisture which was present and then cooled in a stream of pure dry nitrogen. Into the flask, there were then charged 600 g. of trioxane, 400 g. of commercial hexane (B.P. 66–68° C.) and 45 g. of styrene. The water content of the reaction mixture was less than 0.01% by weight, as determined by the Karl Fischer method.

The reaction mixture was then heated to 60° C. in an atmosphere of dry nitrogen and, to the rapidly agitated mixture, there was added 1.0 ml. of boron trifluoride-dioctyl etherate. Polymerisation took place rapidly and the temperature of the reaction mixture rose to 66° C. The reaction mixture was cooled to 50° C. and 200 ml. of acetone and 20 ml. of triethylamine were added with vigorous agitation. The fine slurry was filtered, washed once in 1,000 ml. of commercial toluene (nitration grade) and once in 1000 ml. of acetone.

The polymeric product was then ball-milled for 16 hours in about 2 litres of approximately 2% aqueous ammonia. The finely powdered slurry was then filtered, slurried once in about 2 litres of approximately 0.3% hot aqueous ammonia once in 2 litres of acetone and finally dried in a vacuum oven at 60° C.

A final yield of 460 g. of polymeric product was obtained. A film compression moulded at 175° C. from this product had a thermal decomposition rate ($K_{222}$) of 0.27% per minute.

*Example 2*

A polymeric product was prepared exactly as described in Example 1 except that 30 g. of alpha-methyl styrene were used as comonomer instead of the 45 g. of styrene.

A final yield of 380 g. of polymeric product was obtained.

*Example 3*

A polymeric product was prepared exactly as described in Example 1 except that 30 g. of anethole (p-methoxy beta-methyl styrene) were used as comonomer instead of the 45 g. of styrene.

A final yield of 320 g. of polymeric product was obtained.

*Example 4*

A 2 litre reaction flask fitted with a thermometer, a stirrer, a gas inlet and outlet and a condenser was heated to remove any moisture which was present and then cooled in a stream of pure dry nitrogen. Into the flask, there were then charged 600 g. of trioxan, 400 g. of commerical hexane (B.P. 66–68° C.) and 30 g. of styrene. The water content of the reaction mixture was less than 0.01% by weight as determined by the Karl Fischer method.

The reaction mixture was then heated to 60° C. in an atmosphere of dry nitrogen and, to the rapidly agitated mixture, there was added 1.0 ml. of boron triofluoride-diethyl etherate dissolved in 40 ml. of trichloroethylene. Polymerisation took place immediately and the temperature rose to 66° C. After cooling, 500 ml. of acetone and 50 ml. of triethylamine were added and the polymeric product filtered off. The polymeric product was then ball-milled overnight with about 2 litres of approximately 2% aqueous ammonia. The polymeric product was then filtered, slurried once in approximately 0.3% hot aqueous ammonia, once in acetone and finally dried in a vacuum oven at 60° C.

A final yield of 450 g. of polymeric product having a melting point of about 175° C. and an inherent viscosity of 0.96 was obtained.

A partially flexible film moulded from this product had a thermal decomposition rate ($K_{222}$) of 0.26% per minute. After stabilisation by the incorporation of 3% ethylene urea and 0.1% N-phenyl-1-naphthylamine, each by weight, the thermal decomposition rate of the product was decreased to 0.16% per minute.

Example 5

A 2 litre reaction flask fitted with a thermometer, a stirrer, a gas inlet and outlet and a condenser was heated to remove any moisture which was present and then cooled in a stream of pure dry nitrogen. Into the flask, there was then charged a solution of 30 g. of styrene in 30 g. of commercial hexane (B.P. 66–68° C.). The water content of the reaction mixture was less than 0.01% by weight, as determined by the Karl Fischer method. To the solution there was slowly added 1.0 ml. of boron trifluoridediethyl etherate with cooling. The product containing partially polymerised styrene was then added to a mixture of 600 g. of trioxan and 400 g. of commercial hexane (B.P. 66–68° C.). After cooling, the product was treated in the manner described in Example 4.

A final yield of 360 g. of a polymeric product having a melting point of about 185° C. was obtained, which on moulding at 190° C. gave a tough and flexible film having a thermal decomposition rate ($K_{222}$) of 0.63% per minute.

Example 6

A 2 litre reaction flask fitted with a thermometer, a stirrer, a gas inlet and outlet and a condenser was heated to remove any moisture which was present and then cooled in a stream of pure dry nitrogen. Into the flask, there were then charged 600 g. of trioxan, 400 g. of commercial hexane (B.P. 66–68° C.) and 12 g. of indene. The water content of the reaction mixture was less than 0.02% by weight as determined by the Karl Fischer method.

The reaction mixture was then heated to 60° C. in an atmosphere of dry nitrogen and, to the rapidly agitated mixture, there was added 1.0 ml. of boron trifluoridediethyl etherate. Polymerisation took place rapidly and the completion of the reaction was indicated by a fall of temperature.

After completion of the polymerisation, 300 ml. of acetone containing 10 ml. of triethylamine were added with vigorous agitation. The resulting slurry was filtered and ball-milled for 16 hours with 1200 ml. of approximately 2% aqueous ammonia. The polymeric product was then filtered, washed once with about 2 litres of approximately 0.3% hot aqueous ammonia and then once with 2000 ml. of acetone and finally dried in a vacuum oven at 60° C.

A film compression moulded at 180° C. from the polymeric product was brittle and had a thermal decomposition rate ($K_{222}$) greater than 2% per minute.

Example 7

A polymeric product was prepared exactly as described in Example 6 except that only 6 g. of indene were used.

A film compression moulded at 180° C. from the polymeric product obtained was partially flexible and had a thermal decomposition rate ($K_{222}$) of 1.0% per minute.

Example 8

A polymeric product was prepared exactly as described in Example 6 except that only 3 g. of indene were used.

A film compression moulded at 180° C. from the polymeric product obtained was partially flexible and had a thermal decomposition rate ($K_{222}$) greater than 2% per minute.

Example 9

A polymeric product was prepared exactly as described in Example 6 except that 15 g. of 1-vinyl-naphthalene were used instead of 12 g. of indene.

A film compression moulded at 180° C. from the polymeric product obtained was partially flexible and had a thermal decomposition rate ($K_{222}$) of 1.0% per minute.

Example 10

A polymeric product was prepared exactly as described in Example 6 except that 6 g. of acenaphthylene were used instead of the 12 g. of indene.

A film compression moulded at 180° C. from the polymeric product obtained was brittle and had a thermal decomposition rate ($K_{222}$) greater than 2% per minute.

Example 11

A 2 litre reaction flask fitted with a thermometer, a stirrer, a gas inlet and outlet and a condenser was heated to remove any moisture which was present and then cooled in a stream of pure dry nitrogen. Into the flask, there were then charged 600 g. of trioxan, 7 g. of styrene, 8 g. of propylene oxide and 400 g. of commercial hexane (B.P. 66–68° C.). The water content of the reaction mixture was less than 0.01% by weight as determined by the Karl Fischer method.

The reaction mixture was then heated to 60° C. in an atmosphere of dry nitrogen and, to the rapidly agitated mixture, there was added 1.0 ml. of boron trifluoridediethyl etherate. Polymerisation took place immediately and the temperature rose to 66° C. After cooling, 500 ml. of acetone and 50 ml. of triethylamine were added and the polymeric product filtered off. The polymeric product was then ball-milled overnight with about 2 litres of approximately 2% aqueous ammonia, filtered, slurried once in approximately 0.3% hot aqueous ammonia, once in acetone and finally dried in a vacuum oven at 60° C.

A final yield of 420 g. of polymeric product was obtained. A film moulded from this product was flexible and had a thermal decomposition rate ($K_{222}$) of 0.13% per minute.

Example 12

A 2 litre reaction flask fitted with a thermometer, a stirrer, a gas inlet and outlet and a condenser was heated to remove any moisture which was present and then cooled in a stream of pure dry nitrogen. Into the flask, there were then charged 600 g. of trioxan, 12 g. of styrene and 400 g. of commercial hexane (B.P. 66–68° C.). The water content of the reaction mixture was less than 0.01% by weight as determined by the Karl Fischer method.

The reaction mixture was then heated to 60° C. in an atmosphere of dry nitrogen and, to the rapidly agitated mixture, there was added 1.0 ml. of boron trifluoride/N-phenyl-1-naphthylamine complex. Polymerisation took place immediately and the temperature rose to 66° C. After cooling, the product was treated in an identical manner to that described in Example 11.

A final yield of 450 g. of polymeric product was obtained, which on moulding gave a flexible film.

Example 13

A 2 litre reaction flask fitted with a thermometer, a stirrer, a gas inlet and outlet and a condenser was heated to remove any moisture which was present and then cooled in a stream of pure dry nitrogen. Into the flask, there were then charged 600 g. of trioxan, 12 g. of styrene and 400 g. of commercial hexane (B.P. 66–68° C.). The water content of the reaction mixture was less than 0.01% by weight, as determined by the Karl Fischer method.

The reaction mixture was heated to 60° C. in an atmosphere of dry nitrogen and, to the rapidly agitated mixture, there was added 1.0 ml. of boron trifluoride-diethyl etherate. Polymerisation took place and a further 100 g. of styrene was added gradually over a period of 60 minutes. The reaction mixture was cooled to 50° C. and 200 ml. of acetone and 20 ml. of ethylamine were added with vigorous agitation. The fine slurry was filtered, washed once in 1 litre of commercial toluene (nitration grade) and once in 1 litre of acetone.

The polymeric product was then ball-milled for 16 hours in about 2 litres of approximately 2% aqueous ammonia. The finely powdered slurry was then filtered, slurried once in about 2 litres of approximately 0.3% hot aqueous ammonia, once in 2 litres of acetone and finely dried in a vacuum oven at 60° C.

A final yield of 490 g. of polymeric product was obtained which on moulding gave a film with a thermal decomposition rate ($K_{222}$) of 0.42% per minute.

*Example 14*

A 2 litre reaction flask fitted with a thermometer, a stirrer, a gas inlet and outlet and a condenser was heated to remove any moisture which was present and then cooled in a stream of pure dry nitrogen. Into the flask, there were then charged 600 g. of trioxan, 10 g. of dioxolan, 5 g. of coumarone and 400 g. of commercial hexane (B.P. 66–68° C.). The water content of the reaction mixture was less than 0.01% by weight as determined by the Karl Fischer method.

The polymerisation and subsequent treatment were then carried out in the manner described in Example 11.

A final yield of 595 g. of polymeric product was obtained, which on moulding gave a brittle film.

*Example 15*

A 2 litre reaction flask fitted with a thermometer, a stirrer, a gas inlet and outlet and a condenser was heated to remove any moisture which was present and then cooled in a stream of pure dry nitrogen. Into the flask there were then charged 600 g. of trioxan, 12 g. of styrene, 12 g. of adiponitrile and 400 g. of cyclohexane. The water content of the reaction mixture was less than 0.01% by weight, as determined by the Karl Fischer method.

The reaction mixture was then heated to 60° C. in an atmosphere of dry nitrogen and, to the rapidly agitated mixture, there were added 4.0 g. of triethyl oxonium boro-fluoride. Polymerisation took place rapidly and the temperature rose to 66° C. After cooling, the product was treated in an identical manner to that described in Example 11.

A polymeric product was obtained, which on moulding gave a brittle film.

*Example 16*

A 2 litre reaction flask fitted with a thermometer, a stirrer, a gas inlet and outlet and a condenser was heated to remove any moisture which was present and then cooled in a stream of pure dry nitrogen. Into the flask, there were then charged 600 g. of trioxan, 12 g. of styrene, 12 g. of allyl acetate and 400 g. of commercial hexane (B.P. 66.68° C.). The water content of the reaction mixture was less than 0.01% by weight, as determined by the Karl Fischer method.

The reaction mixture was then heated to 60° C. in an atmosphere of dry nitrogen and, to the rapidly agitated mixture, there was added 4.0 g. of triethyl oxonium boro-fluoride. Polymerisation toook place rapidly and the temperature rose to 66° C. After cooling, the product was treated in an identical manner to that described in Example 11.

A final yield of 480 g. of polymeric product was obtained, which on moulding gave a flexible film with a thermal decomposition rate ($K_{222}$) of 0.21% per minute.

What we claim is:

1. A process for the preparation of an oxymethylene-styrene copolymer material capable of forming films which comprises reacting trioxan under substantially anhydrous conditions in the presence of an electrophilic catalyst at a temperature between 0° C. and 100° C. with a compound selected from the class consisting of styrene and styrene derivatives selected from the group consisting of ring-substituted styrenes, alpha-substituted styrenes, beta-substituted styrenes and vinyl naphthalenes, in an amount of 0.5% to 20% by weight based on the total weight of trioxan and said compound, the water content of the reaction mixture being less than 0.1% by weight.

2. A process as claimed in claim 1 in which trioxan is reacted with at least one alpha-substituted styrene selected from the class consisting of alpha-methyl styrene and alpha-phenyl styrene.

3. A process as claimed in claim 1 in which trioxan is reacted with at least one beta-substituted styrene selected from the class consisting of stilbene, indene, coumarone and acenaphthylene.

4. A process as claimed in claim 1 in which trioxan is reacted with at least one ring-substituted styrene selected from the class consisting of o-, m- and p-methyl styrenes, 1-vinyl and 2-vinyl naphthalenes, and anethole.

5. A process as claimed in claim 1 in which said compound is styrene.

6. A process for the preparation of an oxymethylene-styrene copolymer material capable of forming films in which trioxan is reacted under substantially anhydrous conditions in the presence of an electrophilic catalyst at a temperature between 0° C. and 100° C. with a compound selected from the class consisting of styrene and styrene derivatives selected from the group consisting of ring-substituted styrenes, alpha-substituted styrenes, beta-substituted styrenes and vinyl naphthalenes, in an amount of 0.5% to 20% by weight, based on the total weight of trioxan and said compound, and with at least one other compound capable of copolymerising with trioxan in the presence of an electrophilic catalyst, the water content of the reaction mixture being less than 0.1% by weight.

7. A process as claimed in claim 6 in which said other compound is a compound selected from the class consisting of cyclic ethers, vinyl compounds, allyl ethers, allyl esters, compounds containing at least one isocyanate group, and compounds containing at least one nitrile group.

8. A high molecular weight oxymethylene-styrene copolymeric reaction product produced by the process of claim 1.

9. A high molecular weight oxymethylene-styrene copolymeric reaction product produced by the process of claim 6.

References Cited by the Examiner

UNITED STATES PATENTS

| | | | |
|---|---|---|---|
| 2,378,089 | 6/1945 | Krotzer et al. | 260—73 |
| 2,559,062 | 7/1951 | Dornte | 260—93.5 |
| 3,076,786 | 2/1963 | Brown et al. | 260—67 |
| 3,087,913 | 4/1963 | Kray et al. | 260—67 |

OTHER REFERENCES

Shorygina et al. "Synthesis of Styrene-formaldehyde Copolymers"—Zhurnal Prikladnoi Khimii—vol. 33, No. 1, pp. 251–253, May 1959 (See also C.A. 54–10931i-1960).

Boundy-Boyer "Styrene Its Polymers, Copolymers and Derivatives," published by Reinhold Publishing Corp. N.Y. 1952, p. 700.

Furukawa et al. "Polymerization of Aldehydes and Oxides," Polymer Review 1963 Interscience Pub. Corp. N.Y. pp. 242–245. vol. 3.

(Other references on following page)

OTHER REFERENCES

Angewandte Chemie 73 No. 6 March 1961 pp. 117–186.

O'Kamura et al. "Gamma-Ray Induced Polymerization of Formaldehyde-Isotopes and Radiation, vol. 3, No. 3, 1960 pp. 242 and 243.

Prins "On the Condensation of Formaldehyde with some Unsaturated Compounds," Proceedings of the Academy of Science Amsterdam, vol. 22, 1919 pp. 51–56.

O'Kamura et al. II, "Radiation Induced Polymerization of Trioxane" Isotopes and Radiation, vol. 3, No. 5, 1960, pp. 416–418.

Jordon et al., J. Chem. Soc. (London) 1961, 734–6.

Hohr et al., Die Makromolekulare Chemie 52, 59–69 (1962).

JOSEPH L. SCHOFER, *Primary Examiner.*

H. BUYSTEIN, J. A. SEIDLECK, W. G. GOODSON,
*Assistant Examiners.*